(12) United States Patent
Hudson

(10) Patent No.: US 7,468,717 B2
(45) Date of Patent: *Dec. 23, 2008

(54) METHOD AND DEVICE FOR DRIVING LIQUID CRYSTAL ON SILICON DISPLAY SYSTEMS

(75) Inventor: Edwin Lyle Hudson, Los Altos, CA (US)

(73) Assignee: eLCOS Microdisplay Technology, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/329,645

(22) Filed: Dec. 26, 2002

(65) Prior Publication Data
US 2004/0125090 A1 Jul. 1, 2004

(51) Int. Cl.
G09G 5/00 (2006.01)

(52) U.S. Cl. .......................... 345/98; 345/90; 345/204; 345/100

(58) Field of Classification Search ......... 345/204–206, 345/208–210, 55–104
See application file for complete search history.

(56) References Cited

U.S. PATENT DOCUMENTS

| 4,432,610 A * | 2/1984 | Kobayashi et al. ............ 349/42 |
| 5,566,010 A * | 10/1996 | Ishii et al. ..................... 349/42 |
| 5,926,158 A * | 7/1999 | Yoneda et al. ................ 345/90 |
| 5,945,972 A * | 8/1999 | Okumura et al. .............. 345/98 |
| 5,959,598 A * | 9/1999 | McKnight .................... 345/90 |
| 6,005,558 A * | 12/1999 | Hudson et al. ............... 345/204 |
| 6,262,703 B1 * | 7/2001 | Perner ........................ 345/90 |
| 6,424,330 B1 * | 7/2002 | Johnson ...................... 345/96 |
| 6,621,488 B1 * | 9/2003 | Takeuchi et al. ............ 345/204 |
| 6,731,306 B2 * | 5/2004 | Booth et al. ................ 345/690 |
| 2004/0174328 A1 * | 9/2004 | Hudson ....................... 345/87 |

OTHER PUBLICATIONS

I Uderwood, et al. "Evaluation of an nMOS VLSI array for an adaptive liquid-crystal spatial ligh modulator" IEEE Proc. v.133 Pi.J. No. Feb. 86.
DJ Potter, et al. "Optical correlation using a phas-only liquid crystal over silicon spatial light modulator" SPIE 1564 Opt. Info Proc. Sys & Arch. III (1991).

* cited by examiner

Primary Examiner—My-Chau T. Tran
(74) Attorney, Agent, or Firm—Bo-In Lin

(57) ABSTRACT

The present invention discloses a pixel display configuration by providing a voltage controller in each pixel control circuit for controlling the voltage inputted to the pixel electrodes. The controller includes a function of multiplexing the voltage input to the pixel electrodes and also a bit buffering and decoupling function to decouple and flexible change the input voltage level to the pixel electrodes. The rate of DC balancing can be increased to one KHz and higher to mitigate the possibility of DC offset effects and the image sticking problems caused by slow DC balancing rates. This invention further discloses an enabling technology for switching from one DC balance state to another without rewriting the data onto the panels. Therefore, it is not required to implement a high voltage CMOS designs and standard CMOS technologies can be applied to manufacture the storage cells and control panel for the LCOS displays with lower production cost and higher yields.

23 Claims, 10 Drawing Sheets

METHOD AND DEVICE FOR DRIVING LIQUID CRYSTAL ON SILICON DISPLAY SYSTEMS

BACKGROUND OF THE INVENTION

1. Field of the Invention

The present invention pertains to liquid crystal on silicon (LCOS) displays, and more particularly to driving mechanisms for liquid crystal on silicon displays.

2. Description of the Prior Art

Liquid crystal on silicon (LCOS) microdisplay technology is still challenged by the need to DC balance the liquid crystal material accurately while generating images that are free of flicker and while limiting the RMS voltages to the useful range of the electro-optic efficiency curve of the liquid crystal device. Most liquid crystal devices disclosed in the art fail to meet one or more of these challenges. The current LCOS devices may be thought of as being divided into three classes, based on the method of creating grayscale. Each is prone to a particular class of problems. The three classes of devices are analog drive, digital drive based on simple SRAM, and complex digital drive. All are prone to some degree to the related problems of DC offset and image flicker. The degree to which these problems manifest themselves can influence product acceptability and product longevity and therefore solutions that mitigate or eliminate these problems are worthy subjects of invention.

There are additional considerations beyond the basic problems cited above. For example, in order to achieve savings on power consumption and prolong the life of a display system, it is desirable to have a way of inverting the voltage applied to the liquid crystal pixel without having to change the state of the memory cell and without having to rely on the state of the logic memory cell in order to directly supply a voltage onto the pixel electrode. However, the conventional multiplexing devices that attempt to narrow the range of voltages that are applied to the pixel electrode on an instantaneous basis and that receive input signals directly from a memory cell fail to provide the needed flexibility because they are not capable of independently controlling the memory state that gets driven through the multiplexer to the pixel mirror. Limited by these technical difficulties, the conventional technologies of LCOS display are provide displays of higher quality only with difficulty. Specifically, the displays are often hindered by problems of image sticking and flicker due to the low DC balancing rates as will be further explained below.

Liquid crystal display (LCD) technology has progressed rapidly in recent years, and has become an increasingly common option for display systems. LCD's make up the largest portion of the flat panel display market. This market dominance is expected to continue into the future. The superior characteristics of liquid crystal displays with regard to weight, power, and geometry in image visualization, have enabled them to compete in fields historically dominated by Cathode Ray Tube (CRT) technology, such as high definition television systems, desktop computers, projection equipment, and large information boards. As the cost of LCD systems continues to fall, i.e., is predicted that they will eventually take over the market for traditional CRT applications.

The biggest disadvantages of current CRT systems are their bulky size, geometry, and weight, as well as their high power consumption. These disadvantages are clearly evident when comparing the features of CRT and LCD projection displays with similar characteristics. In general, projection display systems offer several additional advantages over CRT systems. First, projection display systems offer the possibility of using large screens for group viewing with the ability to easily change the image size and position. Second, projection display systems offer high performance, and the ability to accept image data input from. a variety of devices such as computers, television broadcasts, and satellite systems. Virtually any type of video input can be projected through such a system. The application of LCDs to projection systems has further attractive features such as high brightness, high resolution, and easy maintenance. LCD front projection displays provide higher resolution and brightness than comparable CRT-based systems. In comparison with CRT's, installation of LCD projection systems is easy and their viewing angles are generally much wider. Most front projection LCD display systems are compatible with personal computers and can operate with video signals from television systems. LCD front projectors are easily adapted for applications such as home theaters.

Typically, LCD projection systems include small LCD panels, usually ranging from 0.5 to 5 inches in diagonal, a series of dichroic mirrors or filters, and a series of projection lenses to cast the images onto a screen. Commonly, three panel systems are used, where one or more dichroic mirrors divide white light coming from a light source, into the three primary colors of red, green, and blue (RGB). The dichroic minors direct each of the RGB components toward a separate LCD panel. The corresponding LCD panel modulates each of the RGB components of the light according to the input image data corresponding to that color. Output dichroic minors synthesize the modulated RGB light components and project the image onto a viewing screen.

To enhance the luminance and fill factor of the liquid crystal projection panels, reflective LCD pixels are often used. These systems, referred to as Liquid Crystal on Silicon micro-displays (LCOS), utilize a large array of image pixels to achieve a high-resolution output of the input image. Each pixel of the display includes a liquid crystal layer sandwiched between a transparent electrode and a reflective pixel electrode. Typically, the transparent electrode is common to the entire display while the reflective pixel electrode is operative to an individual image pixel. A storage element, or other memory cell, is mounted beneath the pixels and can selectively direct a voltage on the pixel electrode. By controlling the voltage difference between the common transparent electrode and each of the reflective pixel electrodes, the optical characteristics of the liquid crystal can be controlled according to the image data being supplied. The storage element can be either an analog or a digital storage element. More and more often, digital storage elements, in the form of static memory are being used for this purpose.

The liquid crystal layer rotates the polarization of light that passes through it, the extent of the polarization rotation depending on the root-mean-square (RMS) voltage that is applied across the liquid crystal layer. (The incident light on a reflective liquid crystal display thus is of one polarization and the reflected light associated with "on state" is normally of the orthogonal polarization.) The reason that the degree of polarization change depends on the RMS voltage is well known to those skilled in the art—it is the foundation of all liquid crystal displays.

Therefore, by applying varying voltages to the liquid crystal, the ability of the liquid crystal device to transmit light can be controlled. Since in a digital control application, the pixel drive voltage is either turned to dark state (off) or to light state (on), certain modulation schemes must be incorporated into the voltage control in order to achieve a desired gray scale that is between the totally on and totally off positions. It is well known that the liquid crystal will respond to the RMS voltage of the drive waveform in those instances where the liquid crystal response time is slower than the modulation waveform time. The use of pulse-width modulation (PWM) is a common way to drive these types of digital circuits. In one type of PWM, varying gray scale levels are represented by multi-bit words (i.e. a binary number) that are converted into a series of pulses. The time averaged RMS voltage corresponds to a specific voltage necessary to maintain a desired gray scale.

Various methods of pulse width modulation are known in the art. One such example is binary-weighted pulse-width-modulation, where the pulses are grouped to correspond to the bits of a binary gray scale value. The resolution of the gray scale can be improved by adding additional bits to the binary gray scale value. For example, if a four-bit word is used, the time in which a gray scale value is written to each pixel (frame time) is divided into fifteen intervals resulting in sixteen possible gray scale values ($2^4$ possible values). An 8-bit binary gray scale value would result in 255 intervals and 256 possible gray scale values ($2^8$ possible values).

Since most nematic liquid crystal materials only respond to the magnitude of an applied voltage, and not to the polarity of a voltage, a positive or negative voltage, of the same magnitude, applied across the liquid crystal material will normally result in the same optical properties (polarization) of the liquid crystal. However, the inherent physical characteristics of liquid crystal materials cause deterioration in the performance of the liquid crystal material due to an ionic migration or "drift" when a DC voltage is applied to them. A DC current will cause the contaminants always present in liquid crystal materials to drift toward one alignment surface or the other, if the same voltage polarity is continuously applied. This will result in the contaminants plating out onto the alignment layer with the result in that the liquid crystal material will begin to "stick" at an orientation and not respond fully to the drive voltages. This effect is manifested by the appearance of a ghost image of the previous image that is objectionable to viewers. Even highly purified liquid crystal materials have a certain level of ionic impurities within their composition (e.g. a negatively charged sodium ion). In order to maintain the accuracy and operability of the liquid crystal display, this phenomenon must be controlled. In order to prevent this type of "drift", the RMS voltage applied to the liquid crystal must be modified so that alternating voltage polarities are applied to the liquid crystal. In this situation, the frame time of the PWM is divided in half. During the first half of the frame the modulation data is applied on the pixel electrode according to the predetermined voltage control scheme. During the second half of the frame time, the complement of the modulation data is applied to the pixel electrode. When the common transparent electrode is maintained at its initial voltage state, typically high, this results in a net DC voltage component of zero volts. This technique generally referred to as "DC Balancing" technique is applied to avoid the deterioration of the liquid crystal without changing the RMS voltage being applied across the liquid crystal pixel and without changing the image that is displayed through the LCD panel.

Modulation schemes that are employed to drive the liquid crystal pixel elements must therefore be able to accurately control the amount of time the pixel on and "off", in order to achieve a desired gray scale from the pixel. The degree of rotation of light that occurs follows the RMS voltage across the liquid crystal pixel. The degree of rotation in turn affects directly the intensity of the light that is visible to the observer. In this manner modulating voltages influences the intensity perceived by an observer. In this manner gray scale differences are created. The combination of all of the pixels in a display array results in an image being displayed through the LC device. In addition to controlling the root-mean square (RMS) voltage that applied to the pixel, the polarity of the voltage must be continuously "flipped-flopped" so that deterioration of the liquid crystal is avoided. Known modulation schemes are not able to prevent liquid crystal deterioration while still being able to accurately control the RMS voltage as that applied to the liquid crystal in many projection applications where the display device is subjected to high heat loading and high light intensity. This results from a combination of electron-hole-pair generation and increased electron mobility due to the aforementioned conditions.

Other liquid crystal display system, more particularly those in flat panel TFT displays, drive the liquid crystal at slower frequencies on the order of 60 Hz. These systems create gray scale by controlling the charge placed on a storage capacitor that is connected to a transparent pixel electrode that forms part of the pixel element. Increasing or decreasing the charge on the storage capacitor is then applied to realize a gray scale effect. These devices typically refresh the storage capacitor at a rate on the order of 60 Hz to 90 Hz. In this case the liquid crystal may not be responding to the RMS voltage of the display but rather directly to the DC charge placed on the device. This is because the time constants of the liquid crystal are often actually faster than the refresh rate on the device. In this case the display is extremely sensitive to ionic contamination because the charge on the pixel electrode will bleed off quickly and the display will flicker if such ionic contamination is present. The common figure of merit that is used to describe ionic contamination for such displays is the voltage holding ratio or charge holding ratio, a high percent holding ratio indicating low contamination.

The electro-optical properties of many liquid crystal materials cause them to produce a maximum brightness at a certain RMS voltage ($V_{SAT}$), and a minimum brightness at another RMS voltage ($V_{TT}$). Applying an RMS voltage of $V_{SAT}$ results in a bright cell, or full light reflection, while applying an RMS voltage of $V_{TT}$ results in a dark cell, or minimal light output. Increasing the RMS voltage to a value above that of $V_{SAT}$, may reduce the brightness of the cell rather than maintaining it at the full light reflection level. Likewise decreasing the RMS voltage to a value below that of $V_{TT}$, will normally increase the brightness of the cell rather than maintaining it at the zero light reflection level. At RMS voltages between $V_{SAT}$ and $V_{TT}$ the percent brightness increases (or decreases, depending on the electro-optic mode) as the RMS voltage increases. The voltage range between $V_{TT}$ and $V_{SAT}$ therefore defines the useful range of the electro-optical curve for a particular liquid crystal material. It follows that RMS voltages outside of this range are not useful and will cause gray scale distortions if applied to the crystal pixels. It is therefore desirable to confine the RMS voltages applied to the pixels to this useful range between $V_{SAT}$ and $V_{TT}$. Many known display systems drive the logic circuitry with voltages that are outside of the useful range of the liquid crystal, and applying these voltages directly onto the pixel electrode results in. wasted power. For example, logic circuitry may operate at 0 and 5 volts or 0 and 3.3 volts. If the useful range of the liquid crystal material is inside of this range, more time and power must be expended to achieve RMS voltages that are within the useful range. In a system that has a useful $V_{TT}$ to $V_{SAT}$ range of 1.0 to 2.5 volts and that has logic circuitry that operates at 0 to 5 volts, in order to achieve an RMS voltage of 2.5 volts, the pixel must see an equal amount of the 0 volt state and the 5 volt state over a time frame in order to achieve an RMS voltage of 2.5 volts. It would be much more efficient if the logic circuitry operated at the $V_{SAT}$ and $V_{TT}$ levels, rather than at levels outside of the $V_{SAT}$ to $V_{TT}$ range. This would make the time averaging simpler and faster and less power would be required to drive the same systems.

For these reasons, it is desirable to confine the RMS voltages to the useful range of the electro-optical response curve of the liquid crystal material. Furthermore, since the technique of rewriting data to achieve DC balance is used in most of the conventional analog driven TFT panels and micro-displays, it is also desirable to implement a D-C balancing technique for alternating the voltage applied on the liquid crystal, without having to continuously write new data onto the storage element. One of the techniques of accomplishing this it by inverting the voltage applied to the liquid crystal pixel without having to change the state of the memory cell and without having to rely on the state of the logic memory cell in order to direct a voltage onto the pixel electrode.

Conventional multiplexing devices are employed in attempt to narrow the range of voltages that are applied to the pixel electrode on an instantaneous basis and that receive input signals directly from a memory cell. But since the entire panel is written with voltage scales that alternate between a higher voltage range and a lower voltage range, conventional multiplexing devices fail to provide the needed flexibility because they are not capable of independently controlling the memory state that gets driven through the multiplexer to the pixel mirror. For example, in "Miniature FLC/CMOS Color Sequential Display Systems", SID Digest, 1997, Section 21.3, Handschy et al describe a backplane based on an SRAM device with full static control logic and row and column drivers. In the particular instance the pixel mirror voltage is determined solely by the logic state of the SRAM circuit underlying it. Thus the pixel may receive 0 volts or 5 volts, depending on its logic state. The common electrode value is set at 2.5 volts. No provision is described for decoupling DC balance from the writing of data and the device appears to be a simple SRAM device modified by the addition of pixel mirrors and post processing to make the device part of a liquid crystal cell. A further description, of this is found in PCT Publication WO 01/16928. Xue, et al, "Reduction of Effects Caused by Imbalanced Driving of Liquid Crystal Cells." While simple, the device does not enable the enhanced performance that comprises part of the present invention.

Another example of display system is disclosed in U.S. Pat. No. 6,005,558. A display system includes a memory element coupled to a multiplexer. Depending on the state of the memory element, the multiplexer directs one of two predetermined voltages onto a pixel electrode. The multiplexer is situated externally to the memory cell and is controlled by external circuitry to operate in conjunction with DC balance and data load operations. In the disclosed invention, operation of the multiplexer external to the cell requires that the voltages delivered via the rails to the cell be modulated to provide DC balance. This adds substantially to the complexity of the device because the modulated voltage must be correct in all respects as these same voltages are used to drive the pixel mirrors and thus achieve DC balance. Design of a line that cam propagate a number of different voltages across long lines that must accurate in all cases is a significant design constraint. Furthermore, the disclosed invention requires that all elements be globally addressed to function. All these technical difficulties limit the effectiveness of the above inventions in providing practical solutions to the above-mentioned limitations.

Furthermore, since the conventional systems utilize the state of the memory cell as a control signal to direct a voltage onto the pixel mirror, there is no independent means for selecting and directing a narrower range of voltages to be consistent with the electro-optical response curve, onto the pixel electrode. It often leads to further difficulties and limitations. Since the gray scale is symmetrical within those two voltage ranges on either side of the voltage of the common plain, there is a transition phase during data load where both upper and lower voltage ranges are present on the display at the same time. The duration of this period is perhaps 200 to 300 microseconds. Such approach places several limitations on the device: First, the common plane ($V_{COM}$) must be a fixed value because during the transition time data is present on the display in both upper and lower voltage ranges. This in turn means that the display must have a voltage authority range sufficient to permit the writing of analog data in both the upper and lower ranges. While occasionally this may be done within normal voltages, it is more often the case that the developer of the design must use special silicon processing techniques such as those associated with flash memories or with EEPROM technology. In the cases when the EEPROM is used, the resulting parts may have a 10–15 volt operating range so that $V_{com}$ can be set at the 4.5 to 6.5 volt range. This in turn provides a reasonable range of authority for symmetrical driving of the liquid crystal. In the former case, a normal silicon processes may be applied, the best CMOS processes can reach ~6 volts, which dictates a $V_{COM}$ of approximately 2.9 volts. However, with this voltage range, there are very few liquid crystal materials available to satisfy the requirement of the panel. The best design, manufacturing and yield economics are associated with standard CMOS designs rather than the high voltage processes. For these reasons, manufacturing LCOS display panels and other LCD devices often results in a lower yields than average yield rate. Thus, the production costs are increased when non-standard CMOS processes have to be carried out for manufacturing the LCOS device in order to satisfy these operational conditions when suitable liquid crystal materials are used.

Furthermore the technique of applying a DC balance switching rate of once per data load in the conventional micro-displays further creates a situation where the ion migrating within the liquid crystal material begin to plate out toward the end of the data frame at a lower DC balancing rate. Eventually such displays begin to show more "image sticking." where a ghost image reflecting older data remains in a display after new (and different) data is written to the display. It is objectionable and in fact is a specification item for TFT displays that the old data must dissipate within a specified short period. With a low DC balancing rate, a LCOS display often generates a second objectionable flicker artifact due to slow data rates caused by the existence of DC offset mechanisms. The manifestation is that $V_{COM}$ can no longer be set to a point half way between the two voltage drive ranges but rather must be raise or lowered from that point to achieve a flicker-free image. This second problem creates a dilemma between solving flicker and eliminating image sticking. Further details are disclosed in a patented disclosure of U.S. Pat. No. 6,424,330 to Johnson, entitled "Electro-optic Display Device with DC Offset Correction" and the disclosures in that patent is hereby incorporated by reference in this Application.

Therefore, a need still exists in the art of LCOS display to provide improved system configuration and methods of manufacturing to overcome the above-mentioned limitations and difficulties.

SUMMARY OF THE PRESENT INVENTION

It is therefore an object of the present invention to provide a pixel display configuration by providing a voltage controller in each pixel control circuit for controlling the voltage inputted to the pixel electrodes. The controller includes a function of multiplexing the voltage input to the pixel electrodes and also a bit buffering and decoupling function to decouple and flexible change the input voltage level to the pixel electrodes. The rate of DC balancing can be increased to one KHz and higher to mitigate the possibility of DC offset effects and the image sticking problems caused by slow DC balancing rates. This invention further discloses an enabling technology for switching from one DC balance state to another without rewriting the data onto the panels. Therefore, the difficulties of applying a high voltage CMOS designs are resolved. Standard CMOS technologies can be applied to manufacture the storage and control panel for the LCOS displays with lower production cost and higher yields. The disclosures made in this invention thus provide solutions to overcome the above mentioned technical difficulties and limitations as now encountered by those of ordinary skill in the art.

In summary, this invention discloses a method for displaying an image data on a pixel display element. The method includes a step of configuring a voltage control means within the display element for multiplexing and selecting an electrode voltage for applying to an electrode of the pixel display element.

These and other objects and advantages of the present invention will no doubt become obvious to those of ordinary skill in the art after having read the following detailed description of the preferred embodiment, which is illustrated in the various drawing figures.

DETAILED DESCRIPTION OF THE PREFERRED EMBODIMENT

Figure 1:
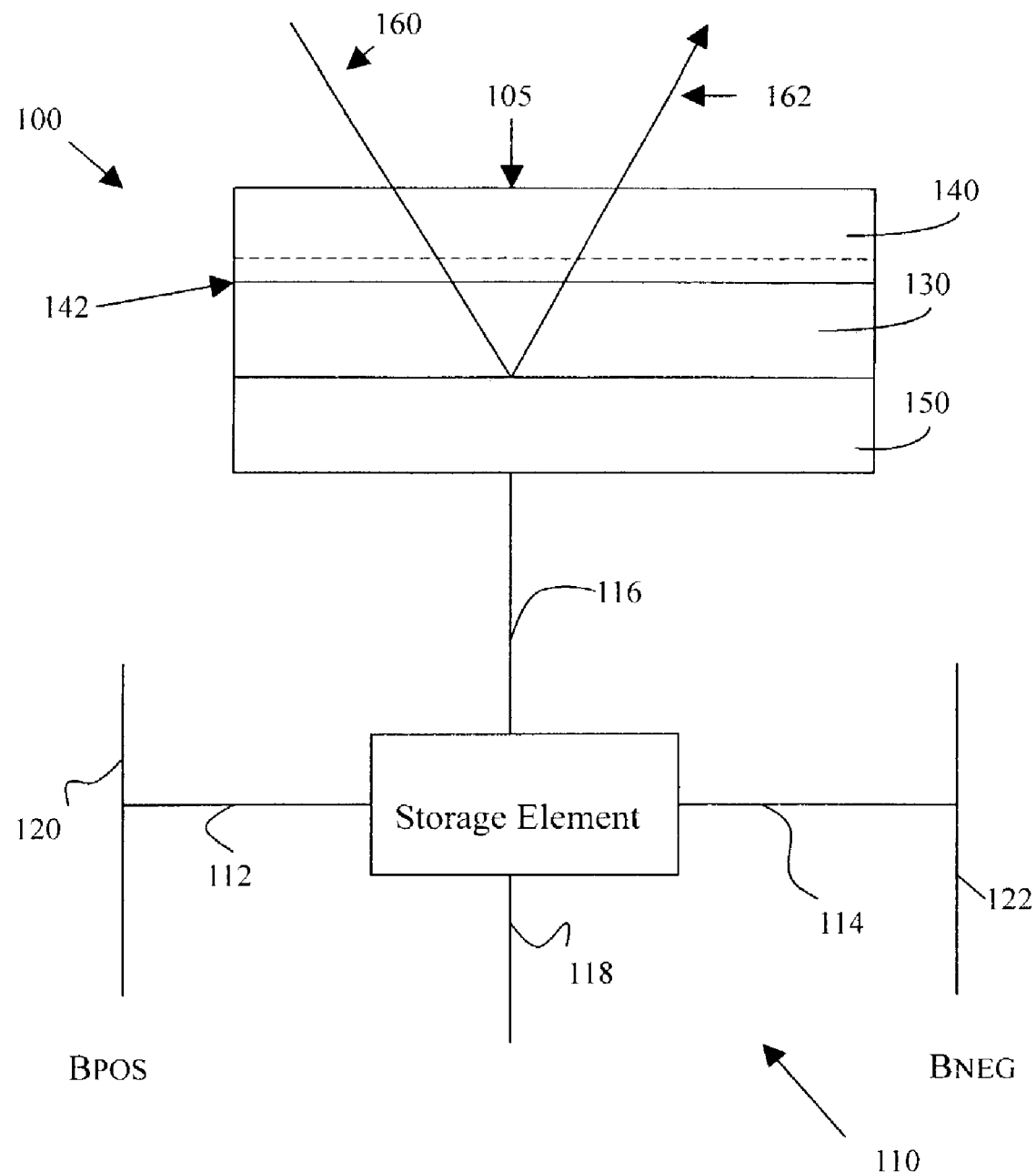
FIG. 1 is a block diagram of a single liquid crystal pixel cell that utilizes a reflective pixel electrode.
Figure 2:
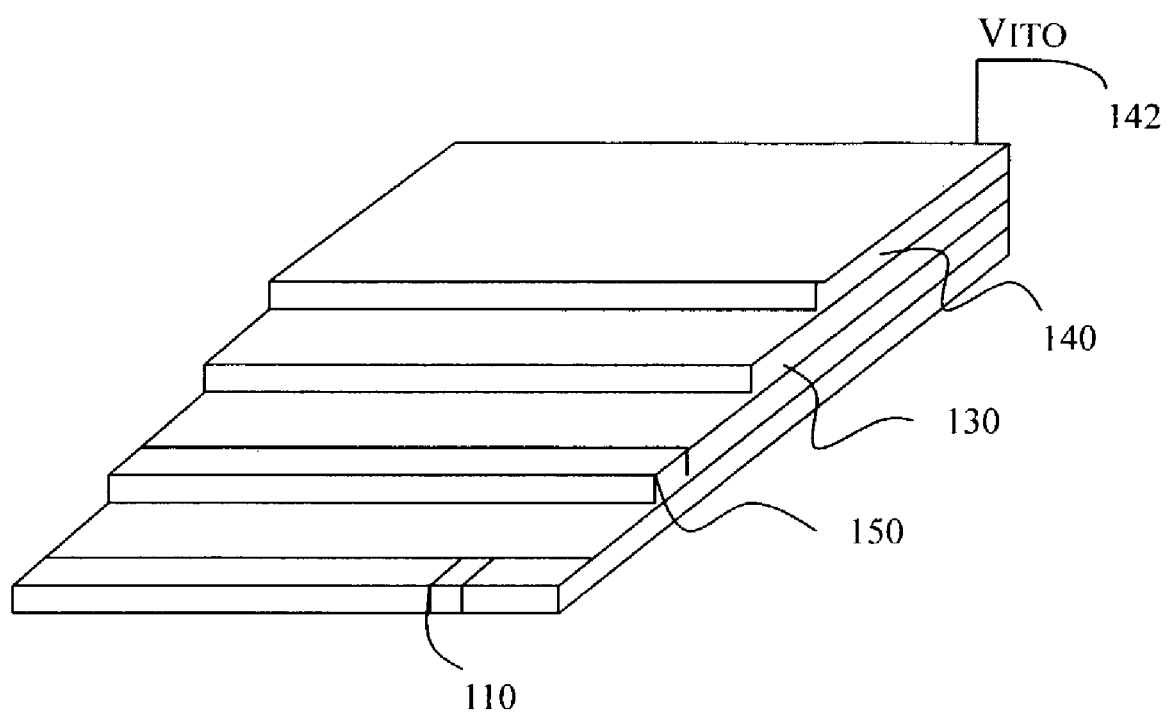
FIG. 2 is a perspective diagram of a liquid crystal on silicon display panel.

FIGS. 1 and 2 show the general construction of a liquid crystal on silicon (LCOS) micro-display panel 100. A single pixel cell 105 includes a liquid crystal layer 130 in between a transparent common electrode 140, and a pixel electrode 150. A storage element 110 is coupled to the pixel electrode 150, and includes complementary data input terminals 112 and 114, a data output terminal 116, and a control terminal 118. The storage element 110 is responsive to a write signal placed on control terminal 118, reads complementary data signals asserted on a pair of bit lines ($B_{POS}$ and $B_{NEG}$) 120 and 122, and latch the data signal through the output terminal 116. Since the output terminal 116 is coupled to the pixel electrode 150, the data (i.e. high or low voltage) passed by the storage element 110 is imparted on the pixel electrode 150. The pixel electrode 150 is preferably formed from a highly reflective polished aluminum. In the LCD display panel in accordance with the present invention, a pixel electrode 150 is provided for each pixel in the display. For example, in an SXGA display system that requires an array of 1280×1024 pixels, there would be an individual pixel electrode 150 for each of the 1,310,720 pixels in the array. The transparent common electrode 140 is a uniform sheet of conductive glass preferably made from Indium Tin-Oxide (ITO). A voltage ($V_{ITO}$) is applied to the common electrode 140 through common electrode terminal 142, and in conjunction with the voltage applied to each individual pixel electrode, determines the magnitude and polarity of the voltage across the liquid crystal layer 130 within each pixel cell 105 in the display 100.

When an incident polarized beam 160 is directed at the pixel cell 105, passes through the transparent common electrode 140 the polarization state of the incident light is modified by the liquid crystal material 130. The manner in which the liquid crystal material 130 modifies the state of polarization of the incident light beam 160 is dependent on the RMS voltage applied across the liquid crystal. A voltage applied across the liquid crystal material 130 affects the manner in which the liquid crystal material will transmit light. For example, applying a certain voltage across the liquid crystal material 130 may only allow a fraction of the incident polarized_light to be reflected back through the liquid crystal material and the transparent common electrode 140 in a modified polarization state that will pass through subsequent polarizing elements. After passing through the liquid crystal material 130, the incident light beam 160 is reflected off of the pixel electrode 150 and back through the liquid crystal material 130. The intensity of an exiting light beam 162 is thus dependent on the degree of polarization rotation imparted by the liquid crystal material 130, which is in turn dependent on the voltage applied across the liquid crystal material 130.

The storage element 110 is preferably formed from a CMOS transistor array in the form of an SRAM memory cell, i.e., a latch, but may be formed from other known memory logic circuits. SRAM latches are well known in semiconductor design and manufacturing and provide the ability to store a data value, as long as power is applied to the circuit. Other control transistors may be incorporated into the memory chip as well. The physical size of a liquid crystal display panel utilizing pixel cells 105 is largely determined by the resolution capabilities of the device itself as well as industry standard image sizes. For instance, an SVGA system that requires a resolution of 800×600 pixels requires an array of storage elements 110 and a corresponding array of pixels electrodes 150 that are 800 long by 600 wide (i.e. 48,000 pixels). An SXGA display system that requires a resolution of 1280× 1024 pixels, requires an array of storage elements 110 and a corresponding array of pixels electrodes 150 that are 1280 long by 1024 wide (i.e. 1,310,720 pixels). Various other display standards may be supported by a display in accordance with the present invention, including XGA (1024×768 pixels), UXGA (1600×1200 pixels), and high definition wide screen formats (2000×1000 pixels). Any combination of horizontal and vertical pixel resolution is possible. The precise configuration is determined by industry applications and standards. Since the transparent common electrode 140 (ITO glass) is a single common electrode, its physical size will substantially match the total physical size of the pixel cell array with some margins to permit external electrical contact with the ITO and space for gaskets and a fill hole to permit the device to be sealed after it is filled with liquid crystal.

Figure 3:
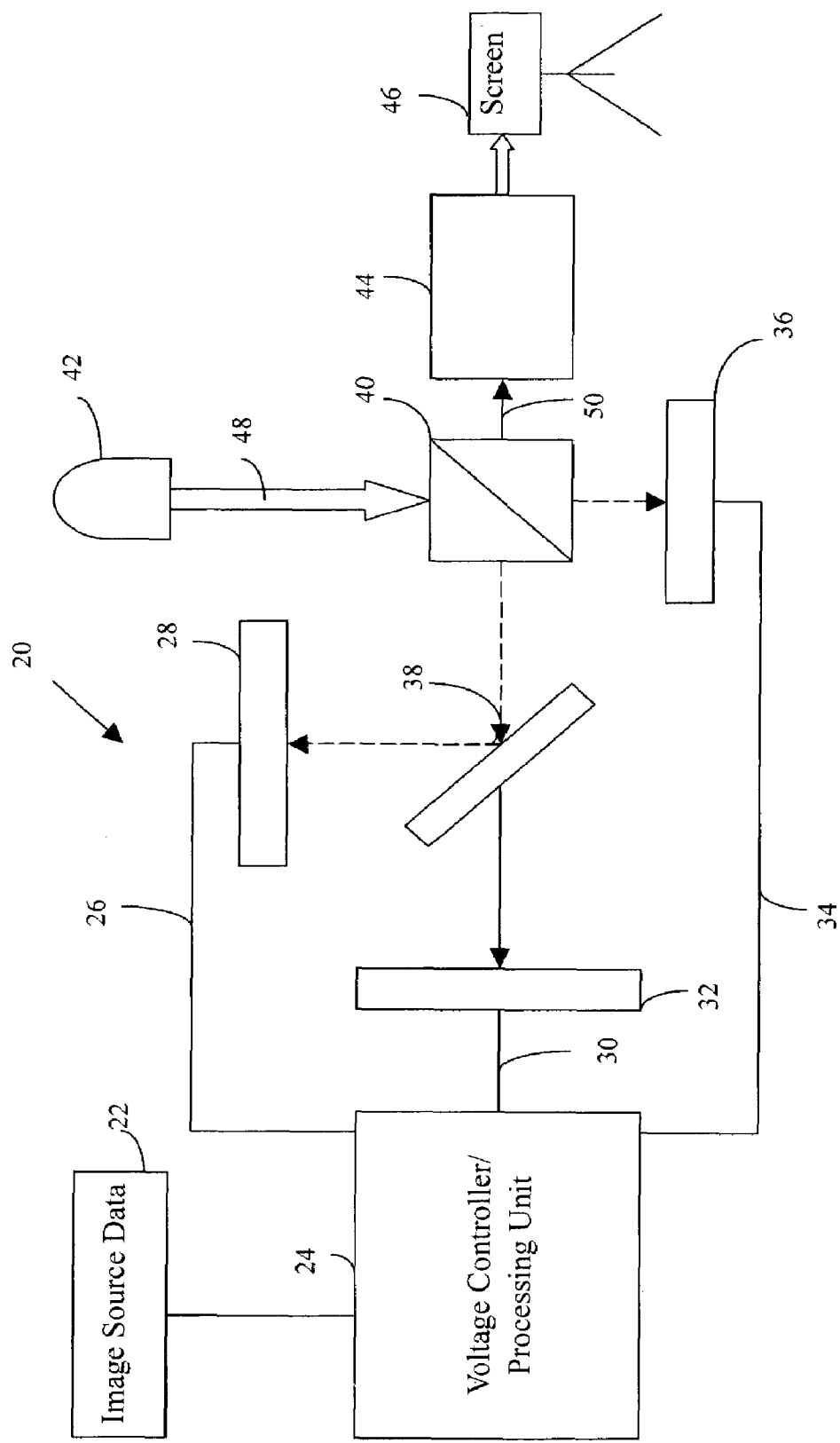
FIG. 3 is a diagram of a projection display system utilizing liquid crystal display panels.

A typical projection display system 20 utilizing liquid crystal display panels, is shown in FIG. 3. Image data is received from an input source 22 such as a television cable or computer and is directed into a control unit 24. The control unit 24 provides such functions as voltage control, memory management, and data processing. In particular, the processing unit divides the image data received from the input source 22 into its red, green and blue components, including elements of shading and brightness. The green components are sent via data line 26 to a green LCD imager 28, the blue components are sent via data line 30 to a blue LCD imager 32, and the red components are sent via data line 34 to a red LCD imager 36. Each of the LCD imagers 28, 32, and 36 are physically equivalent, and are each designed to provide an appropriate gray scale resolution for each of the red, green, and blue colors from the data source.

A light source 42 directs white light, which contains each of the red, green, and blue components, at a first dichroic mirror 40. The red portion of the white light 48 is directed at the red LCD images 36, while the remaining green and blue portions of the white light are directed at a second dichroic mirror 38. The second dichroic mirror 38 separates the green and blue components of the remaining light and directed them at the green and blue LCD imagers 28 and 32 respectively. Each of the red, green, and blue LCD imagers reflects back the respective components of the white light according to the data they each received from the control unit 24. The three components are reassembled as an output image 50 and are projected through a lens 44 onto a display surface 46.

Figure 4:
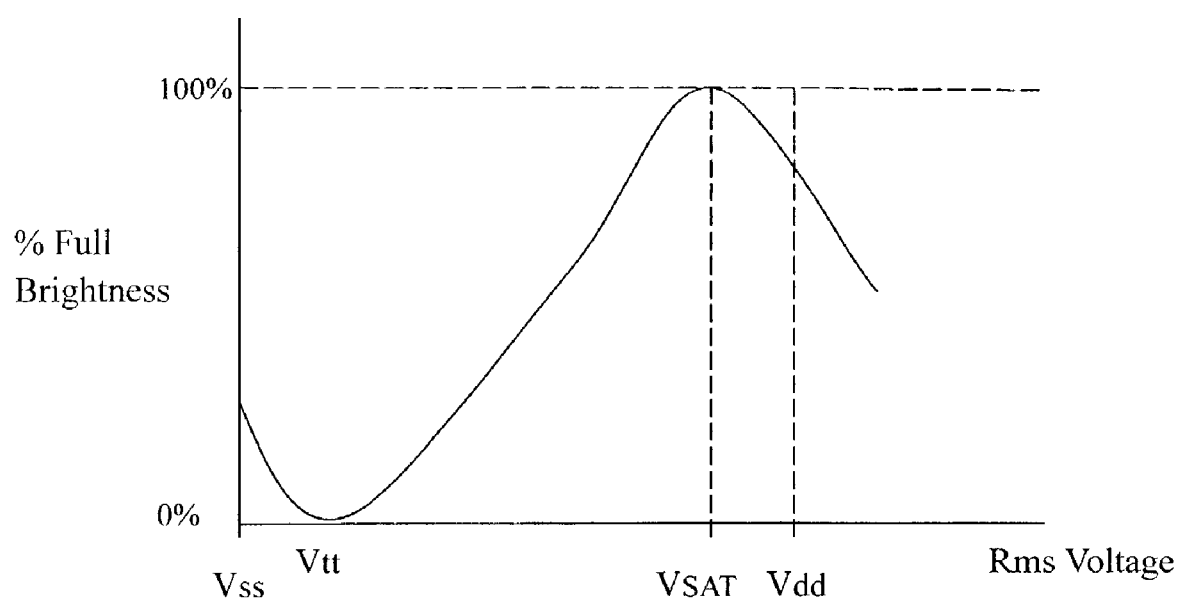
FIG. 4 is an electro-optical response curve for a liquid crystal material.

FIG. 4 shows an electro-optical curve (EO-curve or liquid crystal response curve) for a typical liquid crystal material known as a 45 degree twisted nematic (TN operated in the normally black (NB) mode). As illustrated in FIG. 4, as the voltage applied to the liquid crystal increases, the degree of rotation that is induced onto the polarization state of the reflected light is increased. The liquid crystal material 130 has an RMS voltage $V_{SAT}$, where its degree of polarization rotation is at a maximum (white display) and an RMS voltage $V_{TT}$ where the polarization rotation is at a minimum (black display). Within the range between $V_{TT}$ and $V_{SAT}$, as the RMS voltage increases; the brightness of the light that is transmitted through the liquid crystal material 130 will fluctuate between the white and black ranges. At an RMS voltage that corresponds to the point of 100% brightness, the liquid crystal components are aligned substantially at a 45-degree angle to the incoming light source, thus allowing the light to completely pass through and reflect off of the pixel electrode 150. At an RMS voltage that corresponds to the point of 0% brightness, the crystal components are aligned in a fan of liquid crystal molecule such that the polarization of the reflected light is substantially identical to that of the incoming light source, thus preventing the light from passing through the polarizing element for display. When the RMS voltages are below the $V_{TT}$ point, the display is not completely black, while voltages is above the $V_{SAT}$ point, the display is less than 100% bright. For these reasons, the RMS voltages outside of the useful range for the liquid crystal material 130 are therefore not desirable. The useful portion of the EO curve is voltage range between $V_{TT}$ and $V_{SAT}$.

Figure 5:
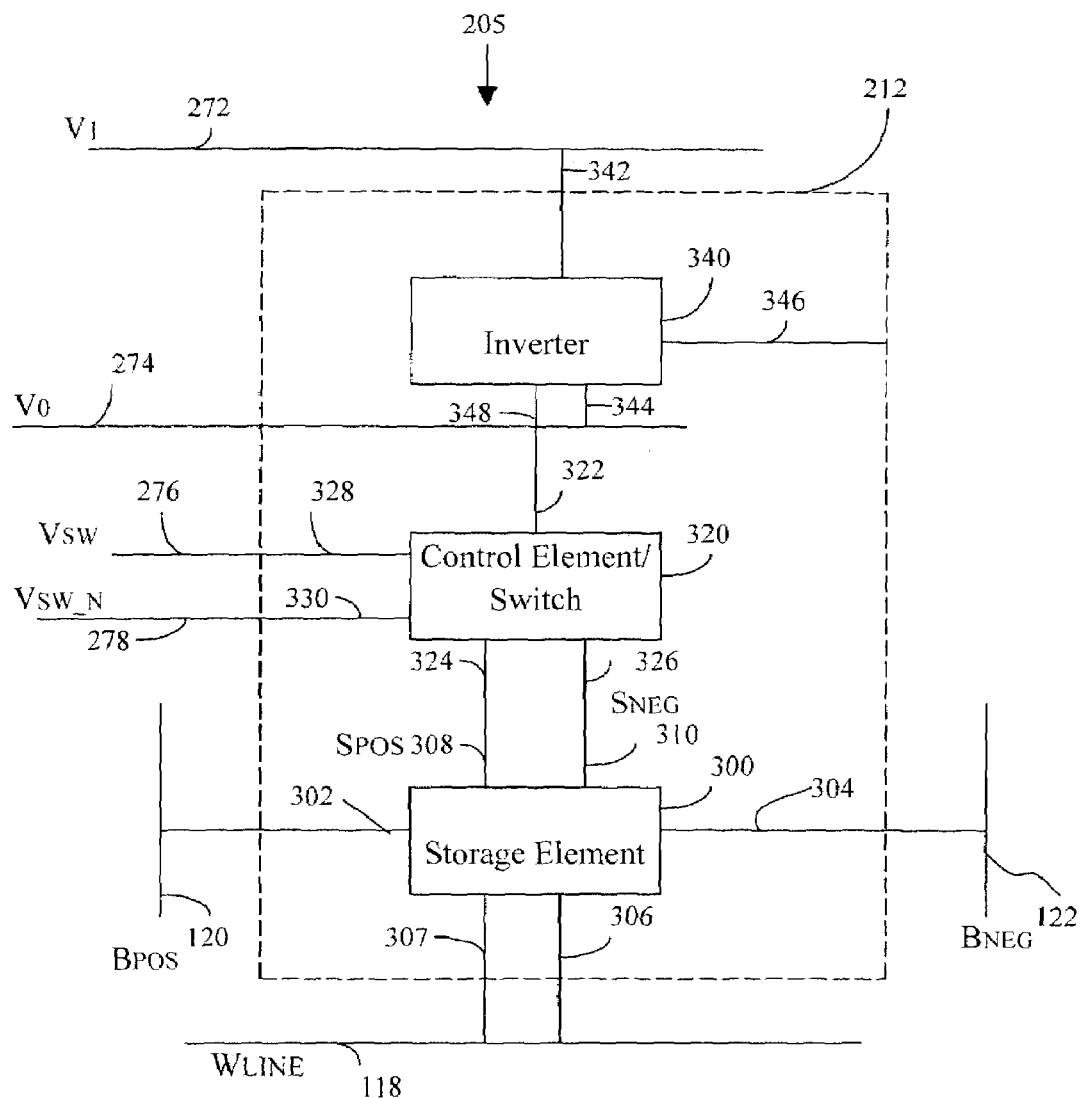
FIG. 5 is a block diagram for showing an independent control and buffering of a binary bit for driving a single pixel.

FIG. 5 shows a block diagram of a single pixel cell 205 of a display in accordance with the present invention. The pixel cell 205 includes a storage element 300, a control element or switch 320, and an inverter 340. The DC balance control element or switch 320 is preferably a CMOS based logic device that can selectively pass to another device one of several input voltages. The storage element 300 includes complementary input terminals 302 and 304, respectively coupled to data lines ($B_{POS}$) 120 and ($B_{NEG}$) 122. The storage element also includes complementary enable terminals 306 and 307 coupled to a word line ($W_{LINE}$) 118, and a pair of complementary data output terminals ($S_{POS}$) 308, and ($S_{NEG}$) 310. In the present embodiment, storage element 300 is an SRAM latch, but those skilled in the art will understand that any storage element capable of receiving a data bit, storing the bit, and asserting the complementary states of the stored bit on complementary output terminals may be substituted for the SRAM latch storage element 300 described herein.

The DC balance control element or switch 320 includes a pair of complementary data input terminal 324 and 326 which are coupled respectively to the data output terminals ($S_{POS}$) 308 and ($S_{NEG}$) 310 of the storage element 300. The switch 320 also includes a first voltage supply terminal 328, and a second voltage supply terminal 330, which are coupled respectively to the third voltage supply terminal ($V_{SW}$) 276, and the fourth voltage supply terminal ($V_{SW\_N}$) 278 of the voltage control element or switch 320. The switch 320 further includes a data output terminal 322.

The inverter 340 includes a first voltage supply terminal 342, and a second voltage supply terminal 344, which are coupled respectively to the first voltage supply terminal ($V_1$) 272, and the second voltage supply terminal ($V_0$) 274 of the voltage element or switch 320. The inverter 340 also includes a data input terminal 348 coupled to the data output terminal 322 of the switch 320, and a pixel voltage output terminal ($V_{PIX}$) 346 coupled to the pixel mirror 212. The function of the inverter and voltage application circuit is to insure that the correct voltage among V0 and V1 is delivered to the pixel mirror.

Figure 6:
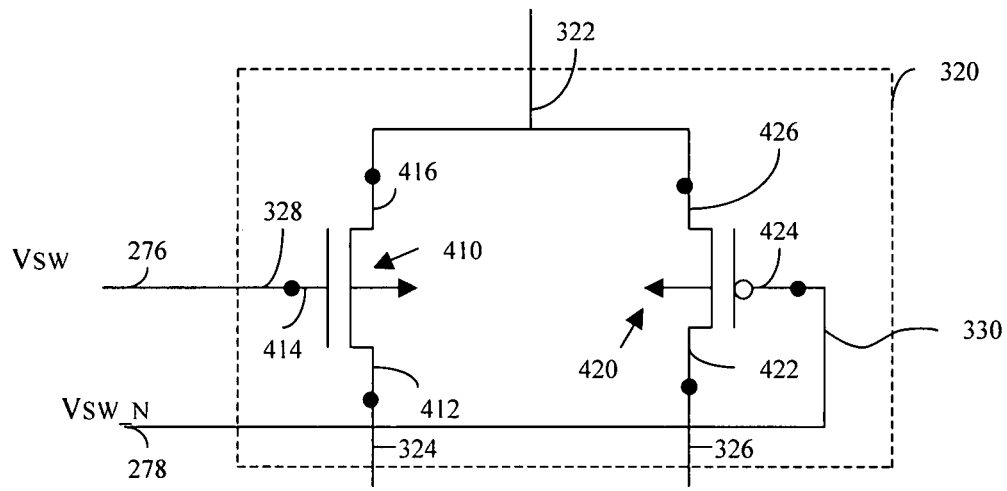
FIG. 6 is a schematic diagram of a preferred DC balance control element implemented in FIG. 5 in accordance with the present invention.

FIG. 6 shows a schematic of a preferred embodiment of the switch 320. The DC balance control switch 320 includes a first p-channel CMOS transistor 410 and a second p-channel CMOS transistor 420. The first transistor 410 includes a source terminal 412 coupled to the input terminal 324, a gate terminal 414 coupled to the first voltage supply terminal 328, and a drain terminal 416 coupled to the data output terminal 322. The second transistor 420 includes a source terminal 422 coupled to the input terminal 326, a gate terminal 424 coupled to the second voltage supply terminal 330, and a drain terminal 426 coupled to the data output terminal 322.

Figure 7:
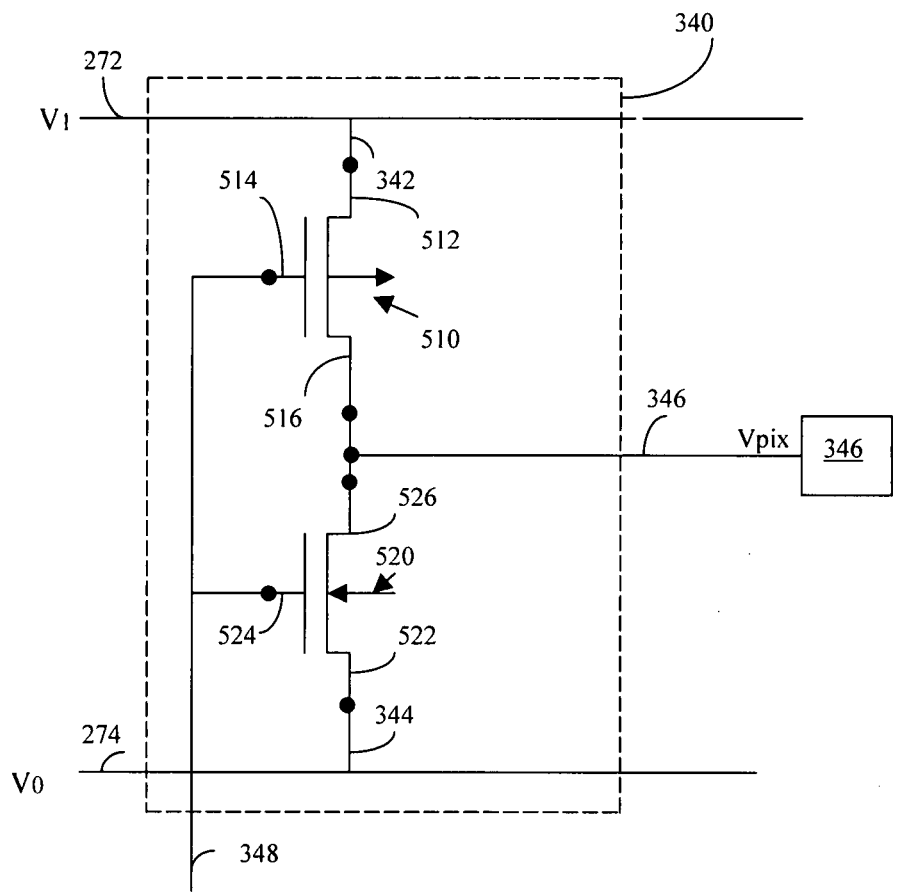
FIG. 7 is a schematic diagram of a preferred buffering and voltage application circuit implemented in FIG. 5 in accordance with the present invention.

FIG. 7 shows a schematic of a preferred embodiment of the inverter 340. The inverter 340 includes a p-channel CMOS transistor 510 and an n-channel transistor 520. The p-channel transistor 510 includes a source terminal 512 connected to the first voltage supply terminal 342, a gate terminal 514 coupled to the data input terminal 348, and a drain terminal 516 coupled to the pixel voltage output terminal ($V_{PIX}$) 346. The n-channel transistor 520 includes a source terminal 522 coupled to the second voltage supply terminal 344, a gate terminal 524 coupled to the data input terminal 348, and a drain terminal 526 coupled to the pixel voltage output terminal ($V_{PIX}$) 346.

Figure 8:
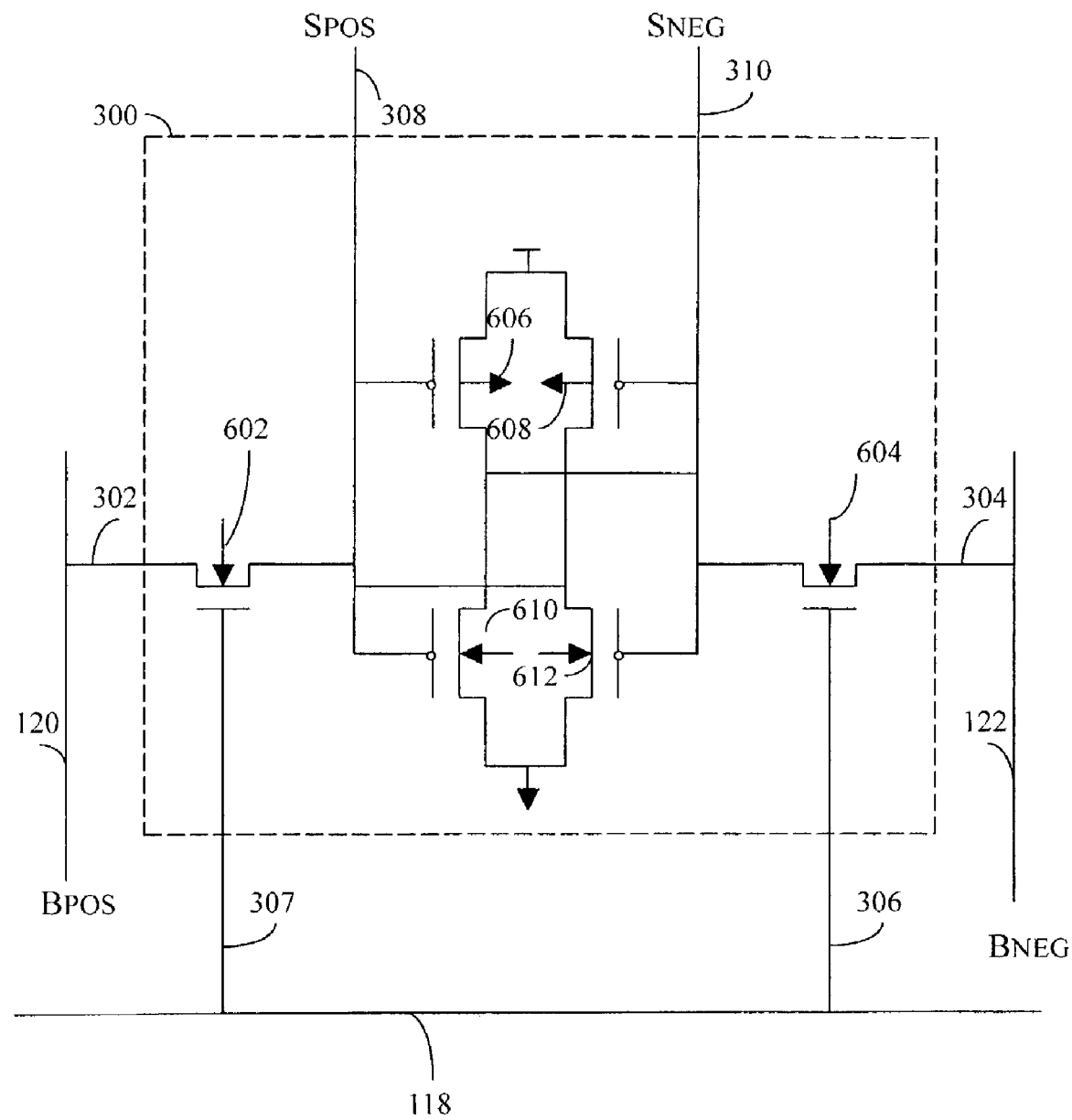
FIG. 8 is a schematic of a preferred storage element implemented in FIG. 5 in accordance with the present invention.

FIG. 8 shows a preferred embodiment of a storage element 300. The storage element 300 is preferably a CMOS static ram (SRAM) latch device. Such devices are well known in the art. See DeWitt U. Ong, *Modern MOS Technology, Processes, Devices, & Design,* 1984, Chapter 9-5, the details of which are hereby fully incorporated by reference into the present application. A static RAM is one in which the data is retained as long as power is applied, though no clocks are running. FIG. 8 shows the most common implementation of an SRAM cell in which six transistors are used. Transistors 602, 604, 610, and 612 are n-channel transistors, while transistors 606, and 608 are p-channel transistors. In this particular cell, the word line 118 turns on the two pass transistors 602 and 604, allowing the ($B_{POS}$) 120, and the ($B_{NEG}$) 122 lines to remain at a pre-charged high state or be discharged to a low state by the flip flop (i.e., transistors 606, 608, 610, and 612). Differential sensing of the state of the flip-flop is then possible. In writing data into the selected cell, ($B_{POS}$) 120 and ($B_{NEG}$) 122 are forced high or low by additional write circuitry. The side that goes to a low value is the one most effective in causing the flip-flop to change state.

The six-transistor SRAM cell is desired in CMOS type design and manufacturing since it involves the least amount of detailed circuit design and process knowledge and is the safest with respect to noise and other effects that may be hard to estimate before silicon is available. In addition, current processes are dense enough to allow large static RAM arrays. These types of storage elements are therefore desirable in the design and manufacture of liquid crystal on silicon display devices as described herein. However, other types of static RAM cells are contemplated by the present invention, such as a four transistor RAM cell using a NOR gate, as well as using dynamic RAM cells rather than static RAM cells.

As configured, the switch 320, being responsive to a predetermined voltage on the first logic voltage supply terminal ($V_{SW}$) 276, and a predetermined voltage on the second logic voltage supply terminal ($V_{SW\_N}$) 278, can selectively direct either one of the high or low data values that are stored in the storage element 300, through the output terminal 322 of the switch 320 and into the input terminal 348 of the inverter 340.

In their most simplified form, transistors are nothing more than an on/off switch. In a CMOS type design, the gate of the transistor controls the passage of current between the source and the drain. In an n-channel transistor, the switch is closed or "on" if the drain and the source are connected. This occurs when there is a high value, or a digital "1" on the gate. The switch is open or "off" if the drain and the source are disconnected. This occurs when there is a low value, or a digital "0" on the gate. In a p-channel transistor, the switch is closed or "on" when there is a low value, or a digital "0", on the gate. The switch is open or "off" when there is a high value, or digital "1" on the gate. The p-channel and n-channel transistors are therefore "on" and "off" for complementary values of the gate signal.

Therefore, the disclosures made according to above descriptions provide an effective solution to satisfy the need to DC balance the liquid crystal material accurately while generating images that are free of flicker and while limiting the RMS voltages to the useful range of the electro-optic efficiency curve of the liquid crystal device. A new pixel display configuration is disclosed in this invention by including in each pixel control circuit a voltage controller for controlling the voltage inputted to the pixel electrodes. The controller includes a function of multiplexing the voltage input to the pixel electrodes and also a bit buffering and decoupling function to decouple and flexible change the input voltage level to the pixel electrodes. The rate of DC balancing can be increased to one KHz and higher to mitigate the possibility of DC offset effects and the image sticking problems caused by slow DC balancing rates. This invention thus discloses an enabling technology for switching from one DC balance state to another without rewriting the data onto the panels. For these reasons, the difficulties of applying a high voltage CMOS designs as that often required by the conventional technologies are resolved. Standard CMOS technologies can be applied to manufacture the storage and control panel for the LCOS displays with lower production cost and higher yields.

Figure 9:
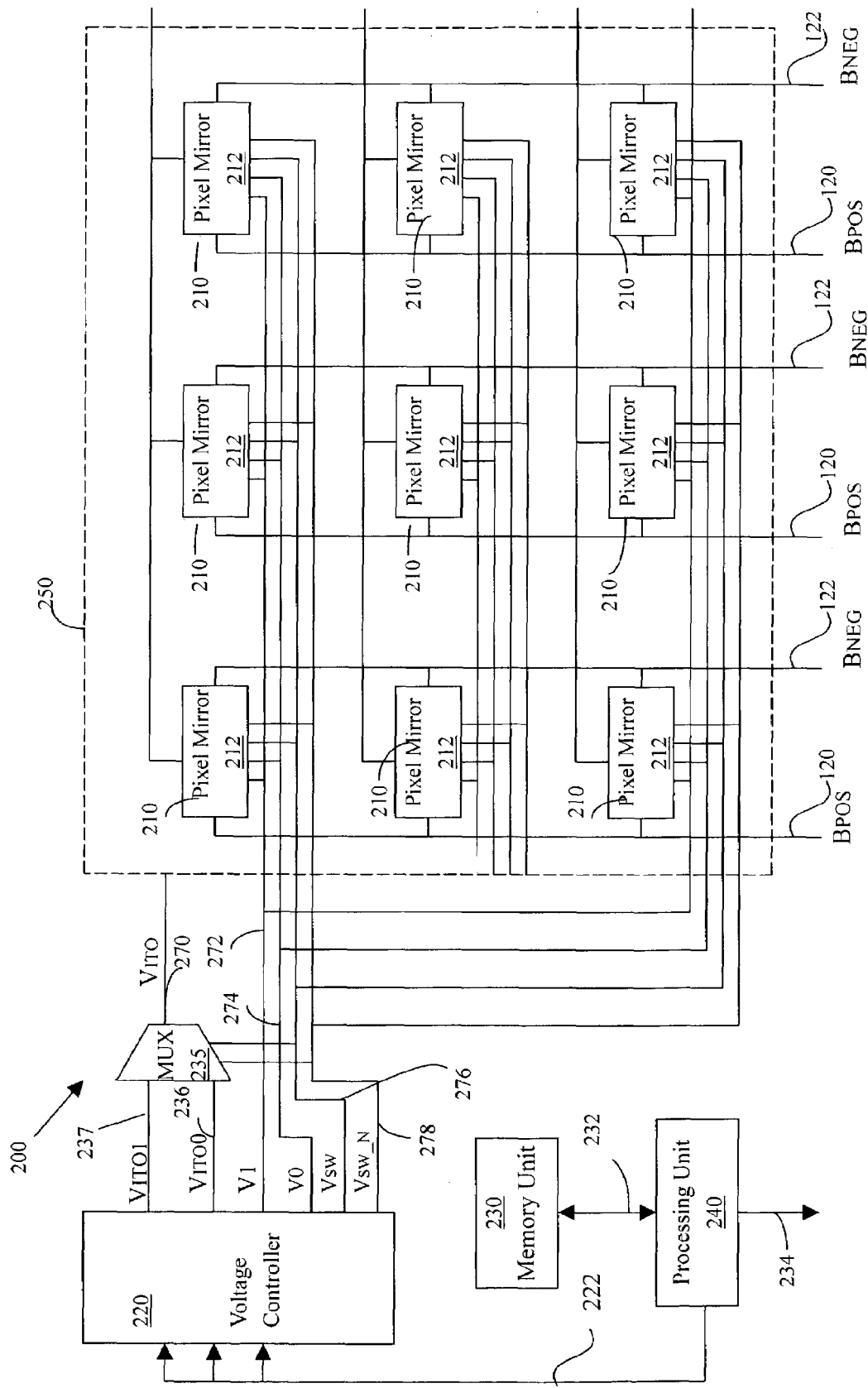
FIG. 9 is a diagram of a multi pixel liquid crystal array in accordance with the present invention.

FIG. 9 shows a display system 200 in accordance with the present invention. The display system 200 includes an array of pixel cells 210, a voltage controller 220, a processing unit 240, a memory unit 230, and a transparent common electrode 250. The common transparent electrode overlays the entire array of pixel cells 210. In a preferred embodiment, pixel cells 210 are formed on a silicon substrate or base material, and are overlaid with an array of pixel mirrors 212 and each single pixel mirror 212 corresponding to each of the pixel cells 210. A substantially uniform layer of liquid crystal material is located in between the array of pixel mirrors 212 and the transparent common electrode 250. The transparent common electrode 250 is preferably formed from a conductive glass material such as Indium Tin-Oxide (ITO). The memory 230 is a computer readable medium including programmed data and commands. The memory is capable of directing the processing unit 240 to implement various voltage modulation and other control schemes. The processing unit 240 receives data and commands from the memory unit 230, via a memory bus 232, provides internal voltage control signals, via voltage control bus 222, to voltage controller 220, and provides data control signals (i.e. image data into the pixel array) via data control bus 234. The voltage controller 220, the memory unit 230, and the processing unit 240 are preferably located on a different portion of the display system than that of the away of pixel cells 210.

Responsive to control signals received from the processing unit 240, via the voltage control bus 222, the voltage controller 220 provides predetermined voltages to each of the pixel cells 210 via a first voltage supply terminal ($V_1$) 272, a second voltage supply terminal ($V_0$) 274, a third (logic) voltage supply terminal ($V_{SW}$) 276, and a fourth (logic) voltage supply terminal ($V_{SW\_N}$) 278. The voltage controller 220 also supplies predetermined voltages $V_{ITO0}$ by volt supply terminal 236 and $V_{ITO1}$ by voltage supply terminal 237 to ITO voltage multiplexer unit 235. Voltage multiplexer unit 235 selects between $V_{ITO0}$ and $V_{ITO1}$ based on the logic state of ($V_{SW}$) 276 and ($V_{SW\_N}$) 278. The ITO voltage multiplex unit delivers $V_{ITO}$ to the transparent common electrode 250, via a voltage supply terminal ($V_{ITO}$) 270. Each of the voltage supply terminals ($V_1$) 272, ($V_0$) 274, ($V_{SW}$) 276, ($V_{SW\_N}$) 278, and ($V_{ITO}$) 270 are shown in FIG. 5 as being global signals, where the same voltage is supplied to each pixel cell 210 throughout the entire pixel array or to the transparent common electrode 250 only in the case of $V_{ITO}$ 270.

Figure 10:
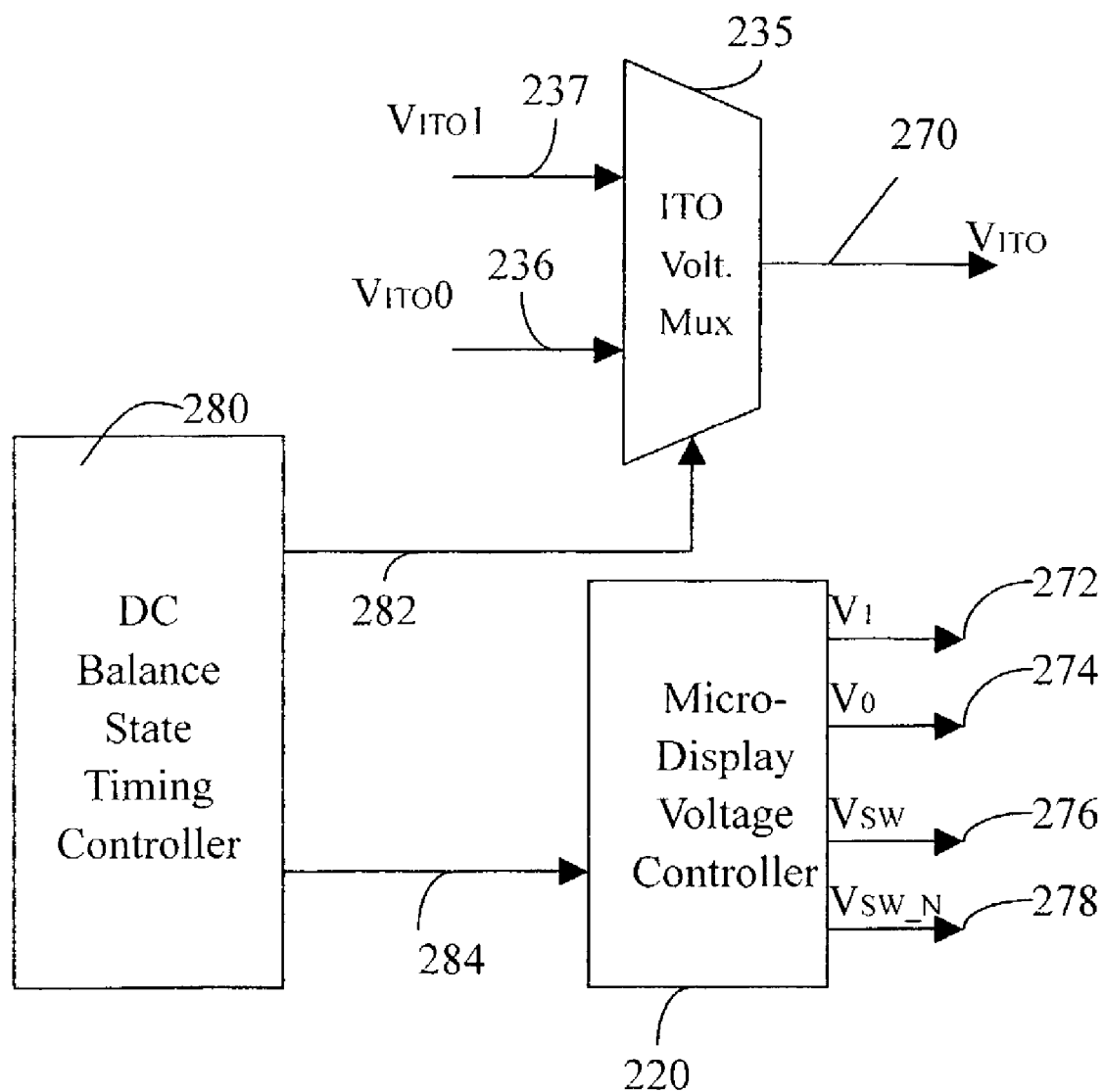
FIG. 10 shows an alternative embodiment of the control of the ITO voltage multiplexer.

FIG. 10 shows an alternative embodiment for control of the ITO voltage multiplexer. In FIG. 10 ITO the DC balance timing controller 280 controls voltage multiplexer 235 via the control line 282. In like manner the timing of state changes of $V_{SW}$ and $V_{SW\_N}$ are controlled by control line 284. Through exercise of control in this manner, minor differences in the timing of changes to $V_{ITO}$ and selection between $V_0$ and $V_1$ are enabled. This may be necessary because the transparent common electrode has a surface area in the range of 50 to 100 square millimeters whereas the surface area of each pixel electrode is in the range of 0.001 square millimeters.

Figure 11:
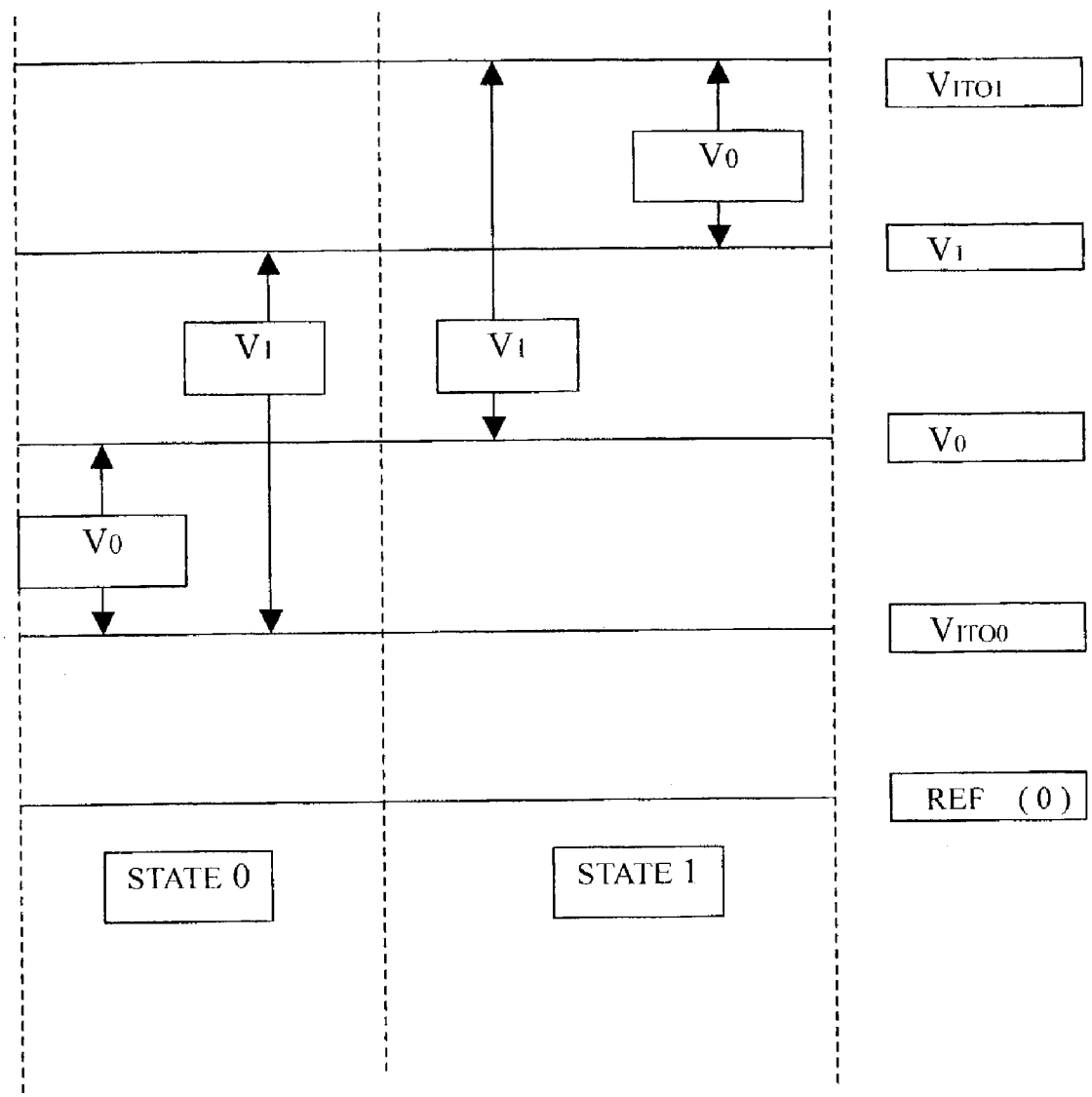
FIG. 11 shows the voltage scale for the voltage controller and for the ITO volt when multiplexed according to the present invention.

FIG. 11 shows a relative voltage scale of voltages generated by the voltage controller starting from zero voltage as a reference voltage that is then followed by $V_{ITO1}$, $V_0$, $V_1$, and $V_{ITO0}$. Using circuits similar to those shown in FIGS. 9 and 10, the voltage levels shown in FIG. 11 can be generated. In case 1, referred to below as State 0, $V_{ITO}$ is set to $V_{ITO0}$, $V_0$ is selected as $V_{BLACK}$ and $V_1$ is selected as $V_{WHITE}$. In case 2, referred to below as State 1, $V_{ITO}$ is set to $V_{ITO1}$, $V_0$ is selected as $V_{WHITE}$ and $V_1$ is selected as $V_{BLACK}$. Inspection of FIG. 11 clearly shows that except for the polarity of the field across the gap, Case 1 and Case 2 are completely equivalent.

The multiplexing of the voltage applied to the common electrode 250 is necessary to the proper DC balancing operations of the liquid crystal display. As can be clearly seen from FIG. 11, in State 0 the display operates in a first mode wherein the common plane is set to $V_{ITO0}$, $V_{BLACK}$ is set to $V_0$ and $V_{WHITE}$ is set to $V_1$. In this mode the effective voltage across the liquid crystal cell for pixels set to the black state is the difference between $V_0$ and $V_{ITO0}$ and the effective voltage across the liquid crystal cell for pixels set to the white state is the difference between $V_1$ and $V_{ITO0}$. The polarity of the field across the pixels cells is established by the depiction of both $V_0$ and $V_1$ as being "higher" than $V_{ITO0}$. To achieve State 0, the circuit is FIG. 10 is configured with logic signal $V_{SW}$ to the high state and $V_{SW\_N}$ to the low state. With the logic signals so set, the common plane voltage 270 ($V_{ITO}$) is set to $V_{ITO0}$. Likewise in the pixel structure presented in FIG. 5, with logic signal $V_{SW}$ set to the high state and $V_{SW\_N}$ set to the low state, the cell level multiplexer is set such that $V_0$ is connected to pixels where the cell data state is set to 0 or "black" and $V_1$ is connected to pixels where the cell data state is set to 1 or "white." This results in the effective voltages across the liquid crystal cell being those depicted in FIG. 11 as State 0. In the foregoing discussion the convention of using a bit value of 0 to designate "off" and using a bit value of 1 to designate "on" is purely arbitrary. The reverse convention is the case if the circuit of FIG. 5 is investigated in detail. The convention used in the text is for clarity since the convention is arbitrary.

In State 1, as can be clearly seen from FIG. 11, the display operates in a second mode similar to the first mode but with the direction of the field across the display reversed. In this second mode the common plane is connected to a second voltage source, $V_{ITO1}$, pixel set to the dark state are now connected to $V_1$ and pixels set to the white state are connected to $V_0$. For the magnitude of the fields in State 0 and State 1 to be of equal magnitude but opposite polarity, it is necessary for $V_{ITO1}$ to be positioned above $V_1$ by the same voltage that $V_{ITO0}$ is positioned below $V_0$. Maintaining this relationship establishes that State 0 and State 1 are mirror images of one another State 1 is effectuated as shown in FIG. 11 when $V_{SW}$ is set to low and $V_{SW\_N}$ is set to high. In this instance the pixel structure presented in FIG. 5 is configured so that the pixel multiplexer circuit provides $V_0$ to the pixel mirror when the pixel data state is set to 1 or "white" and the multiplexer circuit provides $V_1$ to the pixel mirror when the pixel data state is set to 0 or "black".

The liquid crystal cell may be considered as fully DC balanced when the liquid crystal cell dwells in State 0 and State 1 for equal intervals of time. The multiplexing of the common plane voltage from two source voltages thus completes the DC balancing of the cell when said multiplexing of the common plane takes place in time synchronized with the multiplexing of the individual pixels of the liquid crystal cell.

All the above elements work together to provide a pixel design and liquid crystal device where the DC balancing of the device is not directly tied to the writing of data. Indeed, the logic lines $V_{SW}$ and $V_{SW\_N}$ always control the DC balance state of the liquid crystal device by controlling the ITO voltage and the selection of pixel mirror voltage independently of the data state of the individual pixels on the display.

According to the drawings and above descriptions, this Application discloses a display element for displaying a pixel of an image data. The display element includes a pixel mirror electrode connected to a voltage control means. The voltage control means functioning as a multiplexer within the display element. The image display element further includes a logic storage element for storing a binary bit for designating an on-off state of the pixel display element. And the voltage control means connected to the logic storage element for selecting an electrode voltage for applying to the electrode depending on a multiplexing state of the voltage control means and the binary bit received from the logic storage element. In a preferred embodiment, the voltage control means further comprising a DC-balancing means for receiving a DC-balancing control signal for adjusting the multiplexing state of the voltage control means. In another preferred embodiment, the logic storage element further includes a CMOS based memory device. In another preferred embodiment, the logic storage element further includes an SRAM memory device.

In essence, this invention discloses a pixel display element for displaying an image data as a single pixel that includes a voltage control means within the display element for multiplexing and selecting an electrode voltage for applying to an electrode of the pixel display element. In a preferred embodiment, the voltage control means further comprising a multiplexing means for receiving a plurality of input signals for multiplexing and selecting the electrode voltage for applying to the electrode of the display element. In another preferred embodiment, the display system further includes a data buffering means for buffering the electrode voltage generated by the voltage control means for inputting to the electrode of the display element. In another preferred embodiment, the image display system further includes a storage element for storing a data bit for inputting to the voltage control means. In another preferred embodiment, the voltage control means is a CMOS based logic device. In another preferred embodiment, the voltage control means is provided for inputting a binary signal of a high or a low voltage to the electrode. In another preferred embodiment, the storage element comprising a means for asserting one of two complementary states to the voltage control means. In another preferred embodiment, the storage element further comprising a CMOS based memory device. In another preferred embodiment, the storage element comprising a storage element further comprising a static random access memory (SRAM).

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A display device comprising a plurality of pixel cells having a common electrode switchable between a high voltage $V_{ITO\_H}$ and a low voltage $V_{ITO\_L}$ said display device further comprising:

a voltage controller connected to a multiplexing switch in each of said pixel cells to provide control signals to digitally select a switch-on state and a switch-off state to apply a high voltage and a low voltage on a pixel electrode in each of said pixel cells wherein said high and low voltage substantially equal to a voltage represented by V1 and V0 respectively wherein said voltage of V1 and V0 are different from voltages Vdd and Vss as as high and low rail voltages resepectively applied to a backplane of the display device;

said voltage controller further includes a DC balancing state timing controller for synchronizing an inverting operation of said substantially V1 or V0 applied to said pixel electrode and controlling an inverter in each of said pixel cells with a common electrode DC-balancing switch between said high voltage $V_{ITO\_H}$ and low voltage $V_{ITO\_L}$.

2. The display device of claim 1 wherein:
said voltage controller further controlling said high voltage $V_{ITO\_H}$ and a low voltage $V_{ITO\_L}$ and said high voltage V1 and low voltage V0 applied to said pixel electrode different from said Vdd and Vss such that an absolute value of $(V_{ITO\_H}$-V0) is substantially equal to an absolute value of (V1-$V_{ITO\_L}$).

3. The display device of claim 1 wherein
each of said pixel cells further comprising a data storage circuit for outputting a digital signal to said multiplexing switch to selectively apply said V1 or V0 voltages different from said Vdd and Vss to said pixel electrode and said data storage circuit further comprising a CMOS based memory device.

4. The display device of claim 3 wherein
said data storage circuit further comprising an SRAM memory device.

5. The display device of claim 4 wherein
said SRAM memory cell further comprising a 6 transistor SARM memory device.

6. The display element of claim 1 further comprising:
said inverter in each of said pixel cell further comprising an inverting level shifter connected to and receiving an output from said and controlled by said multiplexing switch for outputting a pixel voltage to said pixel electrode to reduce a pixel display transition time.

7. A display device comprising a plurality of pixel cells comprising a common electrode swichable between a high voltage $V_{ITO\_H}$ and a low voltage $V_{ITO\_L}$ and said display device further comprising:
a voltage controller connected to a multiplexing switch in each of said pixel cells to provide controls signals to digitally select a switch-on state and a switch-off state to apply a high voltage V1 and a low voltage V0 on a pixel electrode in each of said pixel cells and controlling an inverter in each of said pixel cells whereby a DC balancing and a pixel image transition for each of said pixel cells is achieved without requiring a contemporaneous production of an internal transition signal from within said pixel cell; and
said voltage controller further controlling said high voltage $V_{ITO\_H}$ and said low voltage $V_{ITO\_L}$ and said high voltage V1 and low voltage V0 applied to said pixel electrode different from voltages Vdd and Vss as high and low rail voltages respectively applied to a backplane of the display device such that absolute value of ($V_{ITO\_H}$-V0) is substantially equal to (V1-$V_{ITO\_L}$).

8. The display device of claim 7 further comprising:
said inverter in each of said pixel cell further comprising an inverting level shifter connected to and receiving an output from and controlled by said multiplexing switch for outputting a pixel voltage to said pixel electrode to reduce a pixel display transition time.

9. A display device comprising a plurality of pixel cell comprising a common electrode switchable between a high voltage $V_{ITO\_H}$ and a low voltage $V_{ITO\_L}$ and said display device further comprising:
a voltage controller connected to a multiplexing switch in each of said pixel cells to provide control signals to digitally select a switch-on state and a switch-off state to apply a high voltage V1 and a low voltage V0 on a pixel electrode in each of said pixel cells and controlling an inverter in each of said pixel cells whereby a DC balancing and a pixel image transition for each of said pixel cells is achieved without requiring a contemporaneous production of an internal transition signal from within said pixel cell; and
each of said pixel cells further comprising a data storage circuit for outputting a digital signal to said multiplexing switch to selectively apply said V1 or V0 voltages to said pixel electrode and said data storage circuit further comprising a CMOS based memory device wherein said V1 and V0 voltages are different from voltages of Vdd and Vss applied to a backplane as high and low rail voltages respectively.

10. The display device of claim 7 wherein:
said multiplexing switch in each of said pixel cells further comprises a CMOS based logic device.

11. The display device of claim 7 wherein:
said multiplexing switch in each of said pixel cells further comprises a first and a second P-channel transistors.

12. The display device of claim 9 wherein:
said data storage circuit further comprising multiple CMOS transistors.

13. The display device of claim 9 wherein:
said storage element further comprising a CMOS based memory device.

14. The display device of claim 9 wherein:
said data storage circuit further a static random access memory (SRAM).

15. The display device of claim 14 wherein:
said SRAM memory cell further comprising a 6-transistor SARM memory device.

16. A method for displaying an image on a display device having a plurality of pixel cells with a common electrode switchable between a high voltage $V_{ITO\_H}$ and a low voltage $V_{ITO\_L}$ comprising:
connecting a voltage controller to a multiplexing switch in each of said pixel cells to provide control signals to digitally select a switch-on state and a switch-off state to apply a high voltage and a low voltage on a pixel electrode in each of said pixel cells wherein said high and low voltage substantially equal to a voltage represented by V1 and V0 respectively; and
controlling an inverter in each of said pixel cells by said controller for synchronizing an inverting of said substantially V1 or V0 applied to said pixel electrode and with a common electrode DC balancing switch between said high voltage $V_{ITO\_H}$ and low voltage $V_{ITO\_L}$; and
said step of digitally selecting a switch-on state and a switch-off state to apply a high voltage and a low voltage on a pixel electrode in each of said pixel cells further comprising a step of controlling said high common electrode voltage $V_{ITO\_H}$ and said common electrode low voltage $V_{ITO\_L}$ and said high voltage V1 and low voltage V0 applied to said pixel electrode such that an absolute value of ($V_{ITO\_H}$-V0) is substantially equal to (V1-$V_{ITO\_L}$) with said V1 and V0 voltages different from voltages of Vdd and Vss applied to a backplane as high and low rail voltages respectively.

17. The method of claim 16 further comprising:
connecting a data storage circuit of a CMOS based memory to said multiplexing switch in each of said pixel cells for providing a input thereto.

18. The method of claim 16 further comprising:
connecting a data storage circuit of a SRAM memory to said multiplexing switch in each of said pixel cells for providing a input thereto.

19. The method of claim 18 wherein said step of connecting a SRAM memory to said multiplexing switch in each of said pixel cells further comprising a step of connecting a six-transistor SRAM memory device to said multiplexing switch in each of said pixel cells.

20. The method of claim 16 wherein:

said step of controlling said inverter in each of said pixel cells further comprising a step of connecting an inverting level shifter to said multiplexing switch for receiving an input from said multiplexing switch for outputting a pixel voltage to said pixel electrode to reduce a pixel display transition time.

21. A method for displaying an image data on a display device comprising a plurality of pixel cells having a common electrode switchable between a high voltage $V_{ITO\_H}$ and a low voltage $V_{ITO\_L}$ and said method further comprising:

connecting a voltage controller to a multiplexing switch in each of said pixel cells to provide control signals to digitally select a switch-on state and a switch-off state to apply a high voltage V1 and a low voltage V0 on a pixel electrode in each of said pixel cells and controlling an inverter in each of said pixel cells whereby a DC balancing and a pixel image transition for each of said pixel cells is achieved without requiring a contemporaneous production of an internal transition signal from within said pixel cell; and said step of digitally selecting a switch-on state and a switch-off state to apply a high voltage and a low voltage on a pixel electrode in each of said pixel cells further comprising a step of controlling said high common electrode voltage $V_{ITO\_H}$ and said common electrode low voltage $V_{ITO\_L}$ and said high voltage represented by V1 and a low voltage represented by V0 applied to said pixel electrode such that an absolute value of ($V_{ITO\_H}$-V0) is substantially equal to (V1-$V_{ITO\_L}$) with said V1 and V0 voltages different from voltages of Vdd and Vss applied to a backplane as high and low rail voltages respectively.

22. The method of claim 21 wherein:

said step of controlling said inverter in each of said pixel cells further comprising a step of connecting an inverting level shifter to said multiplexing switch for receiving an input from said multiplexing switch for outputting a pixel voltage to said pixel electrode to reduce a pixel display transition time.

23. The method of claim 21 further comprising a step of:

storing a data bit in a data storage circuit in each of said pixel cells for inputting to said multiplexing switch for selectively applying to said pixel electrode.

* * * * *